(12) United States Patent
Viglione et al.

(10) Patent No.: US 7,513,702 B2
(45) Date of Patent: Apr. 7, 2009

(54) NON-CONTACT SHUTTER ACTIVATION SYSTEM AND METHOD

(75) Inventors: David Viglione, Rochester, NY (US); Stephen T. Pasquarella, Rochester, NY (US)

(73) Assignee: VA, Inc., Rochester, NY (US)

( * ) Notice: Subject to any disclaimer, the term of this patent is extended or adjusted under 35 U.S.C. 154(b) by 188 days.

(21) Appl. No.: 11/164,260

(22) Filed: Nov. 16, 2005

(65) Prior Publication Data

US 2007/0110432 A1    May 17, 2007

(51) Int. Cl.
    *G03B 9/08* (2006.01)
(52) U.S. Cl. .................................... 396/463; 396/453
(58) Field of Classification Search ......... 396/452–456, 396/463, 467–469
    See application file for complete search history.

(56) References Cited

U.S. PATENT DOCUMENTS

| | | | |
|---|---|---|---|
| 3,533,345 A * | 10/1970 | Starp ........................... | 396/463 |
| 3,595,553 A | 7/1971 | Vincent | |
| 3,664,251 A | 5/1972 | Vincent | |
| 4,060,313 A * | 11/1977 | Kondo ......................... | 359/230 |
| 4,466,723 A * | 8/1984 | Ikari et al. ................... | 396/132 |
| 4,724,452 A | 2/1988 | Mody et al. | |
| 4,881,093 A * | 11/1989 | Dowe .......................... | 396/463 |
| 5,337,110 A * | 8/1994 | Dowe .......................... | 396/449 |
| 5,555,059 A * | 9/1996 | Seo et al. ..................... | 396/463 |
| 6,033,131 A * | 3/2000 | Ghosh et al. ................. | 396/452 |
| 6,652,165 B1 * | 11/2003 | Pasquarella et al. ......... | 396/453 |
| 6,796,728 B2 * | 9/2004 | Miyazaki ..................... | 396/463 |
| 6,806,985 B1 * | 10/2004 | Devenyi ...................... | 359/230 |

OTHER PUBLICATIONS

International Search Report and Written Opinion dated Mar. 28, 2008 re corresponding International Application No. PCT/US06/60186 filed Nov. 13, 2006, 8 pages.

* cited by examiner

*Primary Examiner*—Rodney E Fuller
(74) *Attorney, Agent, or Firm*—Stephen B. Salai, Esq.; Dominic P. Ciminello, Esq.; Harter Secrest & Emery LLP

(57) ABSTRACT

A shutter operating system is provided that depends on electromagnetic energy to operate shutter blades. A permanent magnet and solenoid system operate the shutter blades. Movement of the magnet causes the shutter blades to move between an open and a closed position over a lens. The permanent magnet can be moved between a pair of spaced coils by selectively energizing first one coil then the other. The magnet can be attached directly to a shutter blade or in the case of a rotary shutter, the magnet can be attached to a drive ring that in turn is mechanically coupled to the shutter blades.

44 Claims, 5 Drawing Sheets

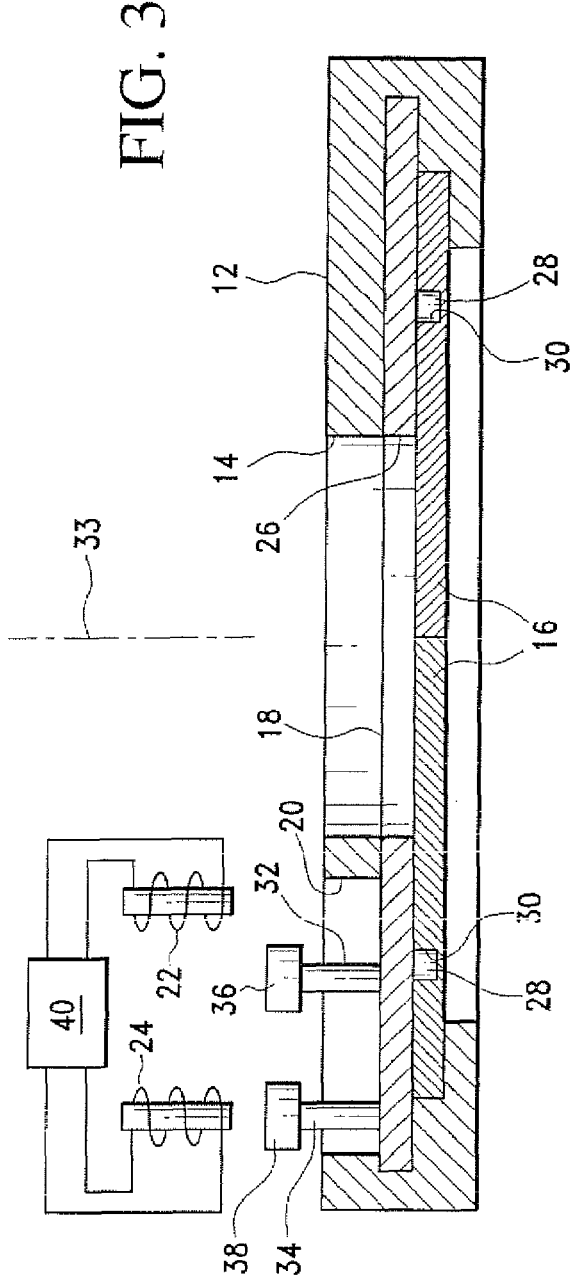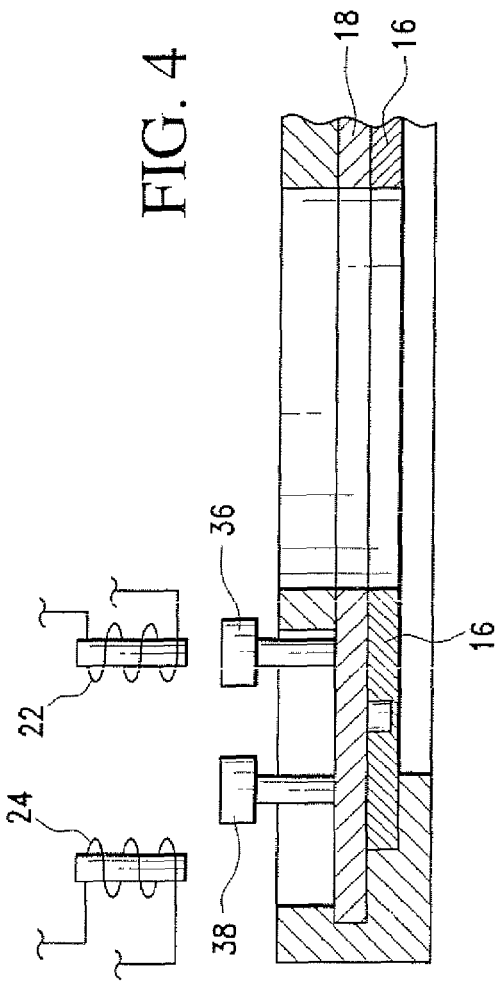

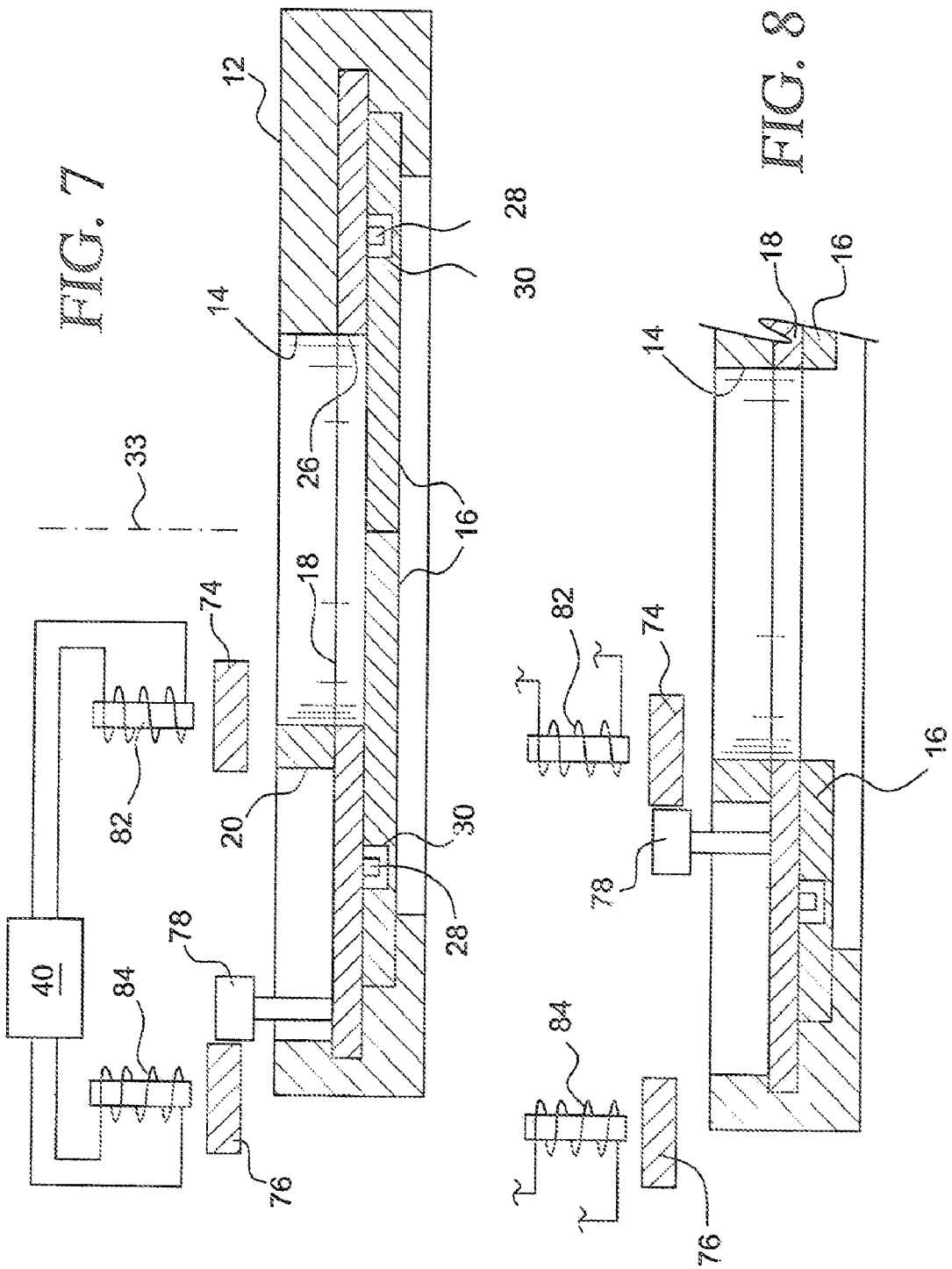

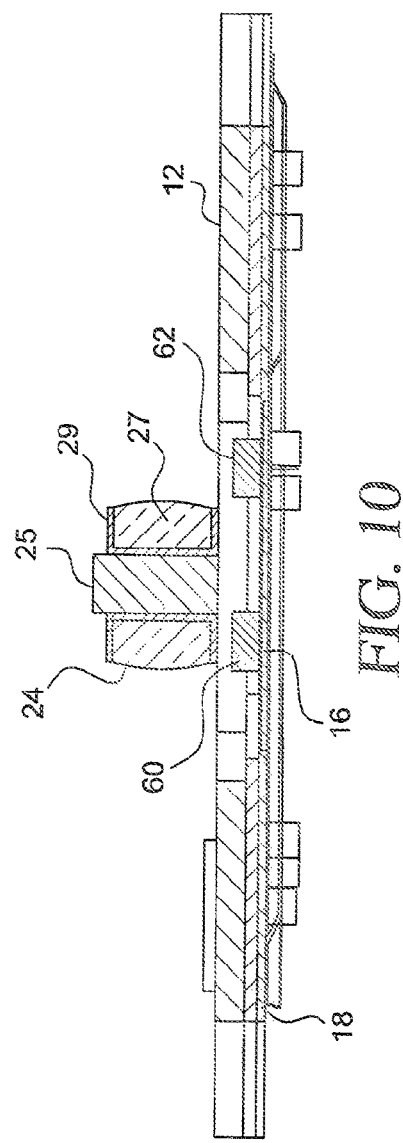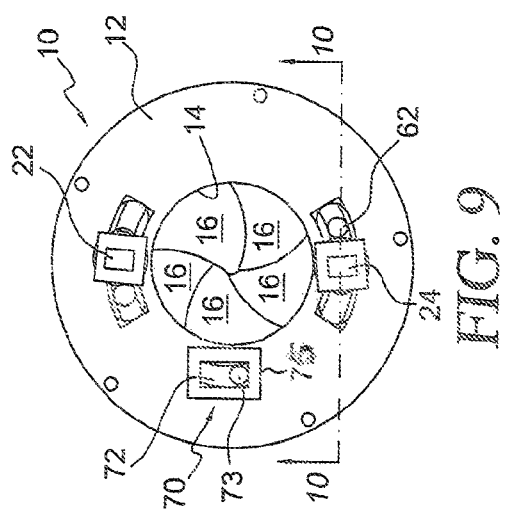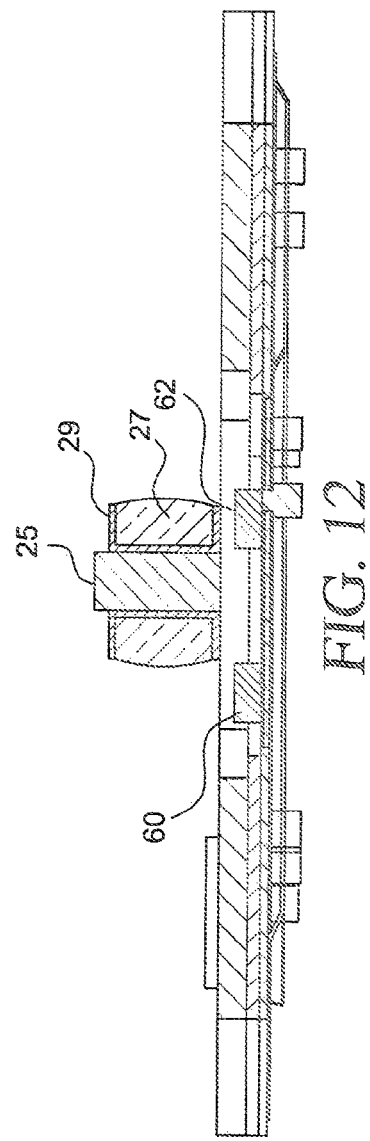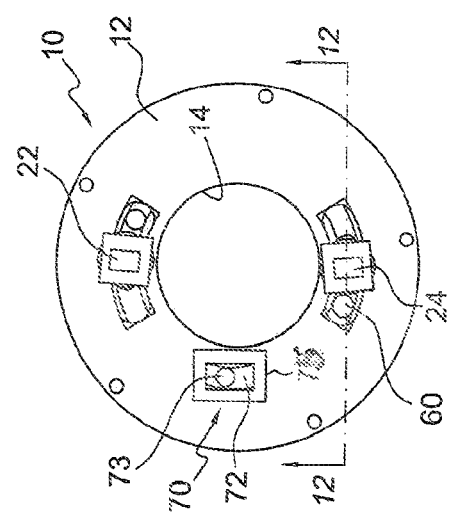

NON-CONTACT SHUTTER ACTIVATION SYSTEM AND METHOD

FIELD OF THE INVENTION

The present invention relates generally to shutter assemblies and more particularly to a photographic-type shutter that relies on electromagnetic forces to open and close and which is, in one embodiment, self-damping to reduce impact and rebound when the shutter is opened or closed.

BACKGROUND OF THE INVENTION

Electrically operated lens shutters used in various types of photographic and laboratory equipment are well known in the art. Lens shutters especially adapted for high speed opening and closing can operate in fractions of a second. An open/close cycle can take place in 30-40 milliseconds or less and repeated cycles at frequencies of 30 cycles per second are common.

Lens shutters generally are of two types. In one type, a so-called "guillotine" shutter has one or two thin, metal blades or leaves arranged to cover a lens opening. Pivot connections allow each blade to swing between a closed position where the blades cover the lens opening and an open position where the blades are drawn aside from the lens opening.

In a second type of shutter a plurality of pivotally mounted blades, usually five, is arranged around the lens opening. Each blade is connected to a rotatable drive ring. In the operation of these shutters, the rotation of the drive ring in one direction causes the blades to swing in unison to an open position. Counter rotation of the ring swings the blades to a closed position over the lens opening after exposure. Generally a linear electric motor is used to activate the shutter. When activated, the linear motor pulls on a lever arm that rotates the drive ring to open the shutter. To close the shutter the motor is deactivated and a spring causes the counter rotation of the drive ring to close the shutter. As noted above, shutters of this sort can cycle open and close 30 times per second.

It is common in both types of shutters to provide a shock absorber or damper that absorbs the impact as the blades are pivoted between the open and closed positions. In this respect, reference is made to various US Patents including U.S. Pat. Nos. 3,595,553; 3,664,251 and 6,652,165 the disclosures of which are incorporated herein by reference. As disclosed in these references, the shock absorber operates to stop the shutter blade very rapidly, yet softly and without damage. There also is little or no bounce as the shutter first is snapped open by the linear electric motor and then is snapped closed by the spring when the motor is de-energized.

In some applications, however, it is desirable to hold the shutter open for an extended period to prolong the exposure time. In these cases it has been the practice to keep the motor activated for the duration of the exposure in order to hold the shutter open against the bias of the spring urging the shutter to a closed opposition.

Maintaining power to the coil of a linear electric motor for an extended period has its drawbacks due mainly to the resulting generation of heat. If not dissipated, the heat could adversely affect the alignment of the optics, cause image distortion and shorten the life of the motor and other heat sensitive components of the shutter system. A fan, heat sink or heat dissipating fins that normally can solve a heat-generating problem are not appropriate in many applications. For example fans are of little use if the shutter is located in a vacuum environment. In military and space exploration applications weight may be an issue so the use of any additional component such as a heat sink or heat radiating fins is not appropriate. Reference is made to U.S. Ser. No. 11/099,744, as disclosing a shutter assembly that is bi-stable in that it allows the shutter to remain open or closed for long periods without generating excessive heat.

In some applications space also is a limitation. Space limitations particularly in the region of the shutter opening dictate the parameters of size and placement of apparatus for holding the shutter open. For example, components placed near the shutter opening must have a relatively low profile so as not to interfere with the cone angle of the light passing through the open shutter. Space limitations also complicate the substitution of one shutter assembly for another as in changing shutter size while maintaining the same base structure.

As noted above, most prior art shutter assemblies mechanically couple a linear electric motor to the shutter for opening and closing the lens opening. For proper operation, particularly at high speeds, the mechanical linkage must be precisely made and the movement of the linkage must be dampened. To applicant's knowledge elimination of a damper system entirely has not been attempted or if attempted, has not been commercially successful.

Accordingly, it is an object of the present invention to provide an operating system for a rotary shutter that eliminates the need for a mechanical linkage between an actuator and the shutter to open and close the shutter.

Another object of the present invention is to provide is to provide a rotary shutter having an electromagnetic operating system.

A further object of the present invention is to provide a method of operating a rotary shutter utilizing electromagnetic energy for opening and closing the shutter.

SUMMARY OF THE INVENTION

In the present invention, a shutter operating system is provided that depends on electromagnetic energy to operate shutter blades so that direct mechanical linkage between a drive motor and the shutter blades reduced or is eliminated entirely. In this respect, the present invention utilizes a permanent magnet and solenoid system to operate the shutter blade wherein the movement of the magnet causes the shutter blade to move between an open and a closed position over a lens opening. In one embodiment of the invention a single permanent magnet is moved between a pair of spaced coils by selectively energizing first one coil then the other. The movement of the magnet results in the opening and closing of the shutter. In this respect the magnet may be attached directly to a shutter blade or in the case of a rotary shutter, the magnet is attached to a drive ring that in turn is mechanically coupled to the shutter blades.

In a preferred embodiment, there are two permanent magnets associated with the shutter blades and there are two fixed coils, one associated with each magnet. The space between the coils is slightly greater than the spacing between the magnets so that if one of the coils is aligned with its associated magnet, the other coil is slightly off set in an outboard direction from its associated magnet. With this arrangement energizing the aligned magnet acts to repel or push away its associated magnet towards the other coil. This moves the shutter blades for example to an open position and also moves the second magnet towards its associated coil. Proper directional movement is assisted by energizing the second solenoid to attract its associated permanent magnet.

As the second magnet approaches the second coil it is attracted to the core of the second coil. The movement of the second magnet then is arrested when its magnetic field captures the core of the second coil. This holds the position of the shutter even after power to both solenoids is cut off.

To swing the shutter blades in the opposite direction, the second coil is energized with a reversed polarity to repel or push away the second magnet. This moves the shutter blades in the opposite direction or towards a closed position and at the same time the first magnet is moved towards its associated coil. Proper directional movement is assisted by energizing the first coil with a reversed polarity so it acts to attract its associated permanent magnet.

As noted above, there is no physical connection between the fixed coils that actuate the shutter and the magnets that cause the shutter blades to move. Accordingly the actuator is mechanically isolated from the shutter blades if the permanent magnets are connected directly to the shutter blades. In cases where the magnets are attached to a drive ring, the number of critical mechanical linkage members is reduced. Also there is no mechanical impacting at the end of travel as the shutter blades open and close so the system is self-damping. Instead the magnetic field of each permanent magnet, as it captures the core of each coil, attenuates the motion of any rebound of the permanent magnet without mechanical damping as it fixes the position of the shutter blades. This does not preclude however the use of a mechanical damper in association with the magnetic damping.

Accordingly, the present invention may be characterized in one aspect thereof by a shutter having an isolated actuator comprising:
  a) a shutter blade movable over a shutter opening to open and close a shutter opening;
  b) a first control element mechanically connected to the shutter blade, the control element responsive to a magnetic field to move the shutter blade between a shutter open and a shutter closed position; and
  c) a second control element mechanically isolated from the first control element selectively generating the magnetic field.

In its method aspect the present invention is a method for operating a shutter comprising:
  a) operatively connecting a permanent magnet to a movable shutter blade movable between a shutter open and a shutter closed position;
  b) mounting an electric coil at a fixed position relative to the permanent magnet mechanically isolated from the permanent magnet; and
  c) selectively energizing the electric coil so the magnet is alternatively repelled and attracted thereby moving the shutter blade between the open and closed positions.

BRIEF DESCRIPTION OF THE SEVERAL VIEWS OF THE DRAWINGS

FIG. 3 is a sectional view taken generally along lines 3-3 of FIG. 1;

FIG. 4 is a sectional view similar to FIG. 3 only showing the shutter in the open position;

FIG. 7 is a sectional view similar to FIG. 3 only showing another embodiment of the invention with the shutter in a closed position;

FIG. 8 is a sectional view similar to FIG. 7 only showing the shutter of FIG. 7 in the open position;

FIG. 9 is a plan view of still another embodiment of the invention showing the shutter in a closed position;

FIG. 10 is a view on a larger scale taken along lines 10-10 of FIG. 9;

FIG. 11 is a plan view showing the shutter of FIG. 9 in an open position; and

FIG. 12 is a view on a larger scale taken along lines 12-12 of FIG. 11.

DETAILED DESCRIPTION OF THE INVENTION

Figure 1:
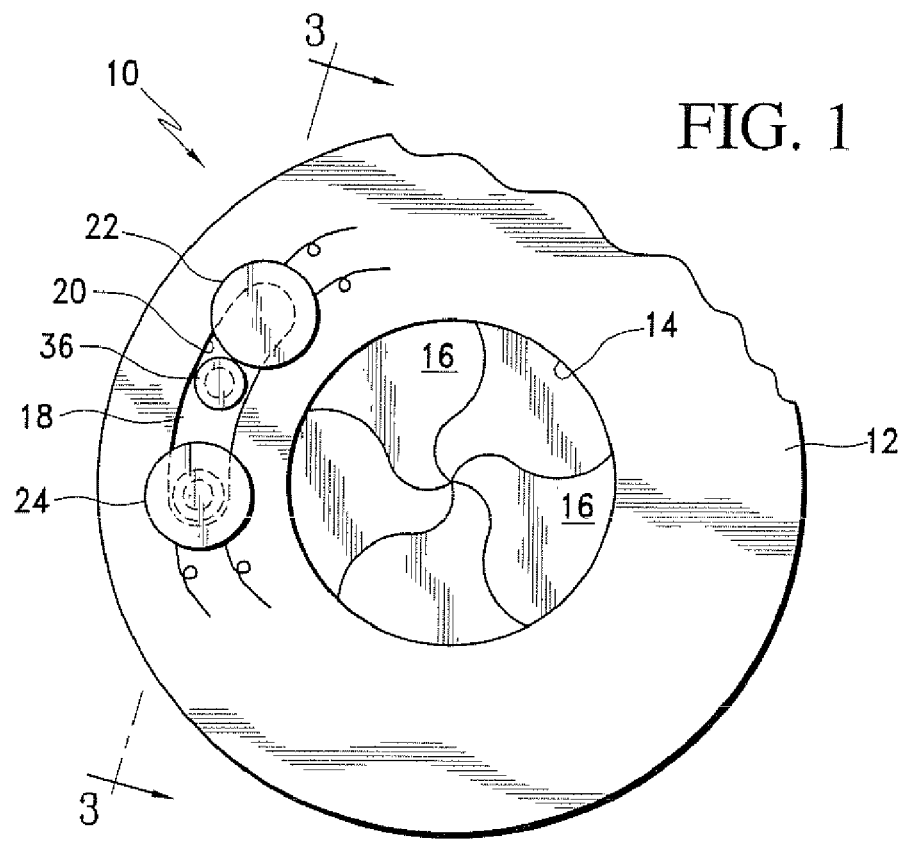
FIG. 1 is a plan view of the shutter showing a base plate with components supported by the base plate removed.

Referring to the drawings, FIG. 1 shows a shutter of the present invention generally indicated at 10, employing the self-damping activation system. The shutter is a type that can be used in any photographic, scientific or calibration application that requires one or more cycles of opening and closing of a shutter opening by driving one or more shutter blade across the opening. In such systems it is common to provide a shock absorber or damper that absorbs the impact as the blades move, usually by pivoting, between the open and closed positions. In this respect, reference is made to various US Patents including U.S. Pat. Nos. 3,595,553; 3,664,251 and 6,652,165 the disclosures of which are incorporated herein by reference.

The shutter includes a base plate 12 having a shutter opening 14. The shutter opening is open and closed by moving a plurality of shutter blades 16 (usually five) in a pivoting action across the shutter opening. In prior art shutters the shutter blades are operated by a linear motor mounted to the base plate. The motor acts through a mechanical linkage to rotate a driver plate wherein the rotation of the driver plate in a to and fro motion acts to open and close the shutter blades. Also mounted to the base plate in the prior art is a damping system that acts as a shock absorber to stop the shutter blade very rapidly, yet softly and without damage. The damping system also produces little or no bounce as the shutter first is snapped open by the action of the linear electric motor and then is snapped closed by a spring mechanism.

The present invention also makes use of a conventional drive ring 18, a portion of which is seen in FIG. 1 through an elongated opening 20 in the base plate. Carried by the base plate are spaced solenoids 22, 24. The solenoids are positioned over the elongated opening 20 for purposes set out herein below.

As shown in FIGS. 3 and 4, the drive ring 18 has an opening 26 that aligns with the shutter opening 14. Extending from the drive ring are pins 28. These pins extend into a corresponding cam slot 30 formed in each of the shutter blades. With this arrangement, the rotation of the drive ring to and fro about an axis 33 that aligns with the axis of the lens opening will cause the shutter blades to pivot between open and closed positions.

Extending from the drive ring 18 and through the opening 26 in the base plate are a pair of posts 32, 34. These posts together with other components described thus far are all formed of a non-magnetic material such as stainless steel. However, supported on each post 32, 34 is a permanent magnet 36, 38 respectively. The permanent magnets 36, 38 are each associated with one of the solenoids 22, 24 respectively.

Figure 2:
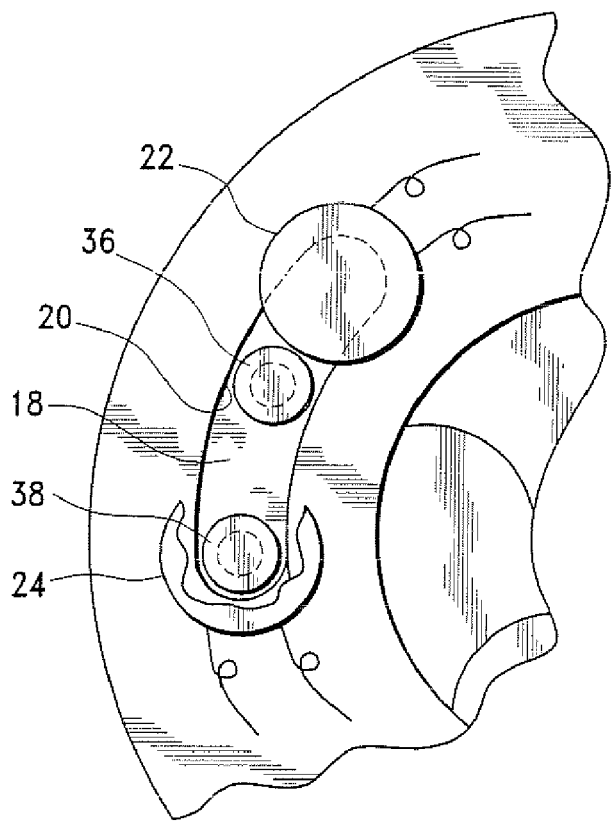
FIG. 2 is a view of a portion of FIG. 1 on an enlarged scale with portions broken away.

As best seen in FIG. 2, the spacing between magnets 36, 38 is slightly less than the spacing between their associated solenoids 22, 24. Accordingly, when the permanent magnet 38 is in axial alignment with the core of its associated solenoid 24, the permanent magnet 36 is inboard of its solenoid 22. This difference in spacing is equal to the throw required to move the shutter blades between an open and a closed position.

In operation and with the shutter in the closed position as shown in FIGS. 1, 2 and 3 with the solenoids not energized, the permanent magnet 38 is attracted to the core of the solenoid 24 by magnetic attraction and aligns with the axis of the solenoid core. The second magnet 36 is far enough away from its associated solenoid 22 that the attractive force between the two is not enough to overcome the attraction between the magnet 38 and the core of the solenoid 24. Thus, even with no power applied to either coil, the shutter is stable and is locked in a closed position.

To open the shutter, a control 40 operates to energize both solenoids. Solenoid 24 is energized with a polarity that repels magnet 38 while the solenoid 22 is energized with a polarity that attracts its associated magnet 36. The combination of the repelling action between the solenoid 24/permanent magnet 38 and the attraction between the solenoid 22/permanent magnet 36 propels the drive ring 28 in a shutter opening direction. When the magnet 36 comes into alignment with the core of its associated solenoid 22 the motion of the drive ring is arrested and stopped so as to lock the shutter blades in an open position as shown in FIG. 4.

De-energizing both solenoids will allow the shutter blades to remain in an open position until the current applied to the solenoids is reversed to reverse the polarity of the solenoids. Accordingly, to close the shutter blades control 40 is operated to energized solenoid 22 with a polarity that repels magnet 36 while the solenoid 24 is energized with a polarity that attracts its associated magnet 38. The combination of the repelling action between the solenoid 22/permanent magnet 36 and the attraction between the solenoid 24/permanent magnet 34 propels the drive ring 28 in the opposite and shutter closing direction. When the magnet 38 comes into alignment with the core of its associated solenoid 24 the motion of the drive ring is arrested and stopped so as to lock the shutter blades in an open position.

Delaying the reversal of the current will allow the shutter to remain in the open position for the time of the delay. Conversely, reversing the current soon after opening will cause the shutter to open and close quickly.

As noted above, the attraction between a magnet and the core of its associated solenoid arrests the motion of the drive ring and the magnets stops in axial alignment with the core of the solenoid due to magnetic attraction. For example, if on opening the inertia of the system carries the magnet 36 slightly beyond the core of its associated solenoid 22, the magnetic attraction between the magnet 36 and the core of the solenoid 22 will pull the two back into alignment. In this fashion the motion of the drive ring is arrested and damped without a mechanical damper and the shutter is stable and locked in both the open and closed positions.

In the embodiment of FIGS. 1-4 two permanent magnets and two solenoids are used and the control 40 acts to reverse the current applied to the solenoids to open and close the shutter. In this embodiment the shutter blades are stable in both the open and closed positions when the solenoids are not energized and there is no mechanical damper or stop, that is contacted during opening or closing to absorb the impact produced by the shutter blades on opening and closing. The embodiment of FIG. 5 utilizes a single solenoid and a single permanent magnet.

Figure 5:
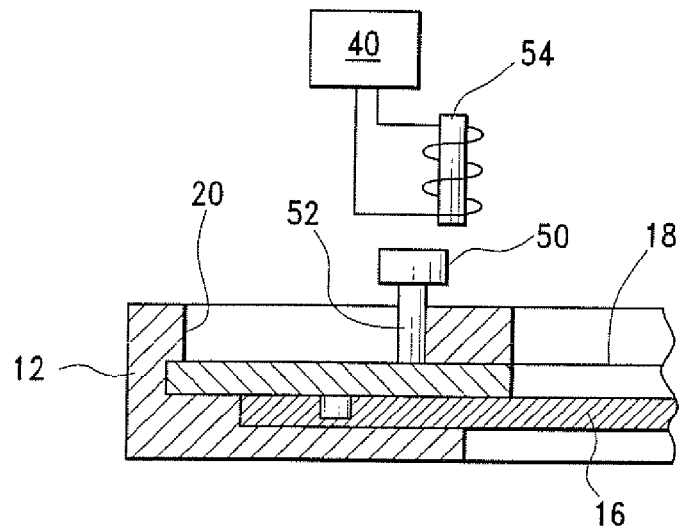
FIG. 5 is a view similar to FIG. 3 only showing another embodiment of the invention.

In this respect FIG. 5 shows a single magnet 50 carried by a post 52, which in turn is connected to the drive ring 18. A single solenoid 54 has its axis off set from the magnet 50.

When no current is applied to the solenoid by the control 40, the natural magnetic attraction between the core of the solenoid 54 and the magnet 50 pulls the magnet toward the solenoid core. This holds the magnet and therefore the drive ring 18 at one end of its path of travel representing the shutter closed position. In the closed position shown, the end of the path of travel either can be defined by the engagement of the post 52 with one end of the opening 20 through the base plate 12 as shown, or by a mechanical damper (not shown).

To open the shutter, the controller 40 energizes the solenoid 54 to produce a polarity that is the same as that of the permanent magnet 50. Accordingly the magnet 50 is repelled away from the solenoid 54. Repelling the magnet causes the drive plate 18 to rotate to a shutter open position. When the controller 40 removes current from the solenoid the magnetic attraction between the magnet 50 and the core of the solenoid 54 returns the drive ring to the shutter closed position.

This embodiment is primarily useful in situations where the shutter is open only for a short period or where several rapid cycles are desired. This is because holding the shutter open requires either that the solenoid stay energized or a mechanical latching mechanism be employed. Also the timing of both applying a current to the solenoid and cutting off power may be such as to prevent the shutter blades from over opening or over closing so that no mechanical damper is required. For example, on opening, the power to the solenoid may be cut off prior to the shutter blades being at the full open position so as to allow the inertia of the blades to move them to the full open position and not beyond. Conversely, as the shutter is closing, the solenoid can be energized to repel the magnet prior to the time that the shutter blades reach the full closed position.

Figure 6:
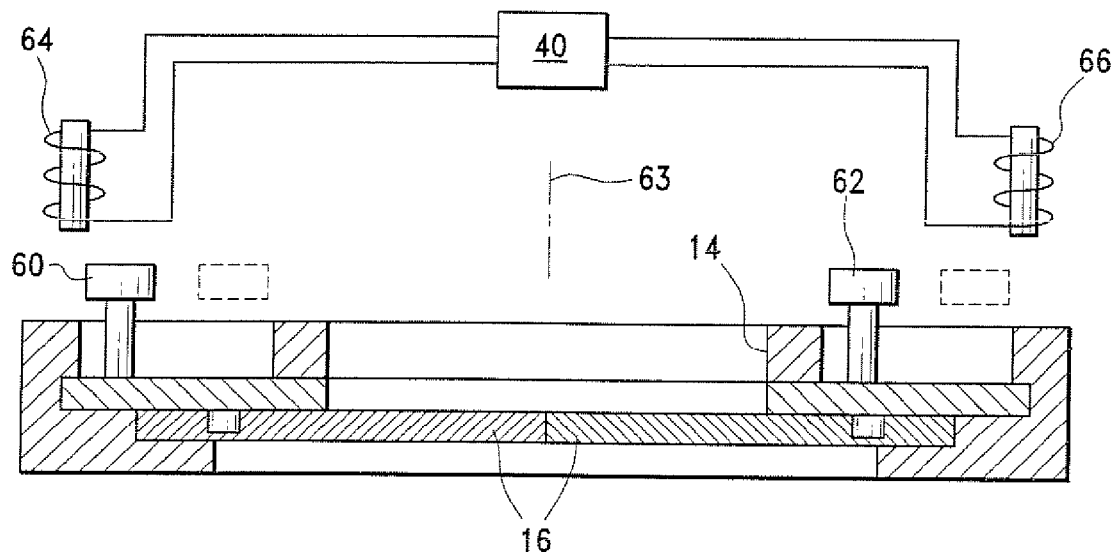
FIG. 6 is a view similar to FIG. 3 showing still another embodiment of the invention.

Still another embodiment is illustrated in FIG. 6. This embodiment utilizes two permanent magnets and two solenoids but eliminates the need to reverse the polarity of the solenoids as in the embodiment of FIGS. 3 and 4. FIG. 6 also illustrates that the magnets 60, 62 can be disposed to either side of the centerline 63 of the shutter opening 14 instead of on the same side as shown in the previous embodiments.

In the FIG. 6 embodiment one of the magnets indicated at 60 is slightly offset from the core of its associated solenoid 64 whereas the magnet 62 is separated from the core of its associated solenoid 66 by a greater distance. With the shutter blades 16 in a closed position the distance between magnet 62 and solenoid 66 is too great to overcome the attraction of the magnet 60 to the core of solenoid 64 so the shutter remains stable and in the closed position with no power supplied to either coil.

To open the shutter blades, current is applied only to solenoid 64 so as to produce a polarity in the solenoid that acts to repel the magnet. The desired direction of motion is induced by the offset so the magnet 60 moves to the position shown in dotted line. This rotates the drive plate to pivot the shutter blades to an open position. Once the magnet 60 is repelled away, it is too far from the core of its associated solenoid 64 to be pulled back by magnetic attraction when current to the solenoid 64 is shut off.

As the drive plate rotates, it carries the magnet 62 closer to its associated solenoid 66 until it reaches the dotted line position, which is the end of travel. In this position the magnet 62 is held to the core of its associated solenoid 66 by magnetic attraction and the shutter blades remain locked in the open position even when no power is applied to either solenoid.

To close the shutter and return the shutter blades to the FIG. 6 position power is applied to solenoid 66 to produce a polarity that repels the magnet 62 so as to move it back to the solid line position. This also moves the magnet 60 back to its solid line position where it is held by magnetic attraction to the core of its associated solenoid 64.

While the embodiment of FIG. 6 uses an electromagnetic force to open and close a rotary shutter, it is not preferred as the system would require a mechanical damping system.

Still another embodiment is illustrated in FIGS. 7 and 8. This embodiment uses one permanent magnet 78 and two solenoids 82, 84 together with two mechanical dampers 74, 76 that engage the permanent magnet 78 at the open and closed ends of its range of travel.

In the FIG. 7 embodiment, in which the shutter is shown closed, the magnet indicated at 78 is resting against the stop surface of a damper 76. Associated solenoid 84 is offset from the rest position of the magnet 78 so that the magnetic field created by the solenoid 84 continues to attract the magnet 78 in its rest position.

An opposing damper 74 is disposed in a corresponding position relative to the position of the magnet 78 when the shutter is in the open position as shown in FIG. 8. In the open position, the magnet 78 rests against a stop surface of the damper 74 and the associated solenoid 82 is positioned so that when energized it continues to attract the magnet 78 causing it to come to a stop resting against the stop surface of the damper 74. The second solenoid 82 is positioned so that the magnetic field created by the solenoid 82 continues to attract the magnet 78 causing it to move into a position resting against the stop surface of the damper 74.

Referring again to FIG. 7, to open the shutter blades, current is applied to the solenoid 84 to create a field that repels the magnet 78 while substantially simultaneously, current is applied to the solenoid 82 to create a magnetic field that attracts the magnet 78. It will be understood that while applying current to both solenoids 82, 84 substantially simultaneously provides an effective opening action, it isn't necessary that the currents be applied simultaneously. For example, current could be applied first to solenoid 84 to create a repelling magnetic field and then subsequently, as the magnet 78 moves towards the other damper 74, current could then be applied to the solenoid 82 to create an attracting magnetic field. The current to solenoid 84 could either be maintained or cut off depending on the characteristics of the opening motion desired. Engergizing both solenoids 82, 84 creates the largest force on the magnet 78 while sequentially energizing the solenoids or in the alternative energizing only one of the solenoids to either attract or repel the magnet 78, provides less force to the drive ring 18. In addition, the current to the solenoids 82, 84 can be modulated to control the movement of the magnet 78 between the shutter open and shutter-closed positions. For example, pulses of varying width could be applied to the two solenoids 82, 84, the polarity of the current applied to the solenoids 82, 84 could be reversed at various points during the movement of the magnet 78 to either accelerate the magnet 78 or decelerate the magnet 78, or the movement of the magnet 78 could be controlled so as to, for example, increase the size of the shutter opening 14 linearly over time or according to any other desired characteristic.

While the embodiment of the invention shown in FIGS. 7 and 8 shows a single set of solenoids 82, 84 and a single magnet 78, multiple magnets and multiple pairs of solenoids may be coupled to the drive ring 18 at various radial positions around the shutter opening. Using multiple sets of solenoids and magnets reduces the amount of current that must be applied to each solenoid to generate the same force on the drive ring 18.

It will also be appreciated that while the embodiment shown in FIGS. 7 and 8 shows a set of solenoids 82, 84 associated with a single magnet 78, variations on this arrangement can also be employed. For example, multiple magnets can be provided at radially spaced positions around the shutter opening 14 and one solenoid 82 or 84 can be associated with each magnet 78. In one example, solenoid 82 could be associated with the first magnet and solenoid 84 associated with the second magnet. Since the magnets are mechanically coupled by the drive plate, a multiplicity of arrangements can be contemplated.

Similarly, it is not necessary that the dampers be physically associated with the magnet or with the magnet that is driven. Any of the dampers known to those skilled in the art could be coupled to the drive ring at a location remote from the magnet and solenoids and still provide effective damping action.

Another embodiment of the invention is shown in FIGS. 9, 10, 11, and 12. Referring first to FIG. 9, a shutter in accordance with this invention is illustrated in a top plan view. Shutter 10 includes a base plate 12, a shutter opening 14 and a plurality of shutter blades 16. A pair of solenoids 22 and 24 are arranged on the base plate in radially spaced apart locations on opposite sides of the shutter opening 14. As may be more dearly seen in FIG. 10 which is a section taken a long line 10-10 of FIG. 9, first and second magnets 60 and 62 are coupled to a drive ring 18 which is in turn coupled to the shutter blades 16. Magnets 60 and 62 are mounted on the drive ring in oppositely pulled configurations, that is to say, the north pole of magnets 60 is on top while the north pole of magnets 62 is on the bottom, or vice versa.

Solenoid 24 includes a core 25 of magnetic material such as a ferrous material surrounded by a coil 27 wound on a bobbin 29. Preferably, in this and the other embodiments, core 25 is made from a material with a low coercive force such as M6 grain oriented 3.3% silicon steel, manufactured by Magnetic Metals of Camden N.J. under the trademark Microsil, to allow the coil 27 to quickly revert to an unmagnetized state when the coil is de-energized and to allow the coil to switch polarity relatively rapidly from one magnetic orientation to the other while retaining only minimal residual magnetism. By applying a signal of appropriate polarity to coil 27, core 25 can be temporarily forced to assume a magnetic state in which the North Pole is either on the top or on the bottom depending on the polarity of the signal. For example, if magnet 60 is arranged with its north pole up, and solenoid 24 is energized so that its north pole is on the bottom, core 25 will repel magnets 60 and attract magnet 62. This is the configuration shown in FIG. 10. This arrangement causes the magnets 60 and 62 to drive the drive ring from the position shown in FIG. 10 to the position shown in FIG. 12. This arrangement uses both the attractive and repulsive forces existing between solenoid 24 and magnets 60 and 62 to move the drive ring and to move the shutter from the closed position shown in FIG. 9 to the open position shown in FIG. 11. Once the shutter reaches the configuration shown in FIG. 12, power is removed from solenoid 24. Because core 25 is made from magnetic material, magnet 62 is attracted to core 24 even when the core is not energized and this maintains the shutter in the open position.

To move the shutter from the open position shown in FIGS. 11 and 12 to the closed position shown in FIGS. 9 and 10, the solenoid is energized so that its south pole is on the bottom. This repells magnet 62 and simultaneously attracts magnet 60 thereby rotating the base plate to the position shown in FIG. 10 and closing the shutter. When the magnet sizing signal is removed from coil 27, magnet 60 continues to be attracted to core 25 and this holds the shutter in the closed position.

To move from the open position shown in FIG. 12 to the closed position shown in FIG. 10, a signal is applied to solenoid 24 that is opposite in polarity from the signal just discussed. This causes core 25 to be temporarily magnetized Optionally, a second solenoid 22 and a second pair of magnets can be provided for increasing the force on the base plate and thereby increasing the speed at which the shutter opens and closes, or decreasing the power that must be applied to the coil to produce the same opening/closing speed as can be produced by a single coil.

Preferably, the shutter 10 is provided with a damper 70. The damper 70 includes a slot 72 formed in the base plate 12 through which a pin 73 a projects upwardly. The slot is preferably provided with damping material such as a ring 75 surrounding the slot, or blocks of energy absorbing plastic or similar material at the ends of the slot. Examples of suitable damping material are described in U.S. Pat. No. 6,652,165. The damper increases the life cycle of the shutter by softening the shock that would otherwise occur as a solenoid moves to shutter from the fully open to the fully closed position. In addition, the damper quiets the shutter which may be important in certain applications.

The damper may be arranged in a variety of ways. While it is possible for the shutter blades themselves to be directly coupled to the damping system if the shutter blades are relatively sturdy, this is presently not preferred if the shutter blades are very thin and susceptible to damage on impact. Preferably, the damper is separate from the solenoid actuator and from the magnets as shown in FIGS. 9 through 12.

Alternatively, the damper may be arranged to directly engage the magnets. The configuration of the damper would be substantially the same as the configuration shown in FIGS. 9 and 11 but the damper 75 would be arranged with respect to one or both of the magnets 60 and 62, to provide the same sort of damping action provided with respect to pin 73 in FIGS. 9 and 11.

As another alternative, the damper may be arranged to dampen motion between the base plate and the drive ring.

Preferably, in all arrangements of the damper, the damper material is arranged to engage the magnet or pin at a position at least slightly before the position that the magnet or pin would reach if the damper were not present. This ensures that the damper controls the end position rather than the combination of the magnet and solenoid controlling the end position. It also ensures that when the magnet is retained in his position by virtue of the magnetic force between the magnet and the solenoid core, that position is fixed by the damper and known in advance.

Accordingly, it should be appreciated that the present invention accomplishes its intended objects in that it provides an operating system for a shutter that eliminates the need for a mechanical linkage to open and close the shutter. It also provides a shutter that is opened and closed by an electromagnetically driven operating system and which, in at least one embodiment eliminates the need for mechanical damping.

Having described the invention in detail, what is claimed as new is:

1. A shutter assembly comprising:
  a) a base plate having a shutter opening;
  b) a drive ring having first and second oppositely-facing surfaces, the drive ring mounted to the base plate for to and fro rotation about an axis extending perpendicular to the base plate;
  c) at least one shutter blade attached to the first surface of the drive ring movably mounted with respect to the base plate for movement across the shutter opening between a shutter open and a shutter-closed position;
  d) a cam and cam slot on adjacent surfaces of the shutter blade and drive ring cooperating to move the shutter blade to one or another of the open and closed positions upon the to and fro rotation of the drive ring;
  e) a post fixed to the second surface of the drive ring and extending into an elongated opening in the base plate;
  f) a permanent magnet fixed to the post;
  g) a first fixed electric solenoid carried by the base plate and positioned over the elongated opening and being selectively energized to alternatively attract and repel the permanent magnet along the elongated opening thereby moving the drive ring in to and fro rotation and respectively move the shutter to one and then the other of the shutter open and closed positions; and
  h) the base plate, drive ring, and shutter blade being of a non-magnetic material.

2. A shutter assembly as in claim 1 wherein energizing the solenoid repels the permanent magnet to move the shutter to one of the open and closed positions and deenergizing the solenoid attracts the permanent magnet to the core of the solenoid to move the shutter to the other of the open and closed positions.

3. A shutter assembly as in claim 1 comprising a second fixed electric solenoid selectively energized to alternatively attract and repel the permanent magnet in reverse synchronization with the first fixed electric solenoid and respectively move the shutter to one and then the other of the shutter open and closed positions.

4. A shutter assembly as in claim 1 comprising a second post fixed to the drive ring and extending into the elongated opening in the base plate and a second permanent magnet fixed to the second post, the second permanent magnet being arranged so that it is repelled by the solenoid when the first permanent magnet is attracted, and attracted when the first permanent magnet is repelled.

5. A shutter assembly as in claim 4 comprising a second fixed electric solenoid carried by the base plate and positioned over the elongated opening and being selectively energized to alternatively attract and repel the second permanent magnet in reverse synchronization with the first fixed electric solenoid and respectively move the shutter to one and then the other of the shutter open and closed positions.

6. The shutter assembly as in claim 4 comprising a mechanical damper operative for damping the motion of the shutter blade by engaging at least one of the permanent magnets.

7. A shutter assembly as in claim 1 comprising a mechanical damper operative to damp the motion of the shutter blade at one of the open and closed positions.

8. A shutter assembly as in claim 1 comprising a mechanical damper operative for damping the motion of the shutter blade at both of the open and closed positions.

9. A shutter assembly as in claim 1 wherein the first solenoid is positioned over the permanent magnet.

10. A shutter assembly as in claim 9 defining a gap between a top surface of the permanent magnet and a bottom surface of the first solenoid.

11. A shutter assembly as in claim 9 wherein a magnetic pole of the first solenoid is offset from a magnetic pole of the permanent magnet in at least one of the shutter open and closed positions.

12. A shutter assembly as in claim 11 wherein the magnetic pole of the first solenoid is offset from the magnetic pole of the permanent magnet in both the shutter open and closed positions.

13. A shutter assembly as in claim 1 further including a second fixed electric solenoid carried by the base plate, the first and second solenoids positioned over the permanent magnet.

14. A shutter assembly as in claim 13 wherein a magnetic pole of the permanent magnet is positioned between a magnetic pole of the first solenoid and a magnetic pole of the second solenoid in both the shutter open and closed positions.

15. A shutter assembly comprising:
   a) a base having an arcuate opening therein;
   b) a shutter blade mounted in the base and movable over a shutter opening to open and close the shutter opening;
   c) a drive ring mounted in the base generally face-to-face with the shutter blade for to and fro rotation about an axis extending perpendicular to the plane of the shutter blade, the drive ring having first and second oppositely-facing surfaces, the drive ring and shutter blade having adjacent surfaces provided with a pin and a cam slot mechanically connecting the shutter blade to the first surface of the drive ring;
   d) a first permanent magnet connected to the second surface of the drive ring, the permanent magnet traveling in a path extending along the arcuate opening in response to a magnetic field to move the shutter blade between a shutter open and a shutter closed position;
   e) a first electric solenoid mechanically isolated from the permanent magnet and selectively generating the magnetic field, the solenoid being at a fixed position relative to the drive ring such that selectively energizing the solenoid alternately attracts and repels the permanent magnet a distance sufficient to rotate the drive ring an amount equal to the throw required to move the shutter blade to one of the open and closed positions.

16. A shutter assembly as in claim 15 wherein energizing the solenoid repels the permanent magnet to move the shutter to one of the open and closed positions and deenergizing the solenoid attracts the permanent magnet to the core of the solenoid to move the shutter to the other of the open and closed positions.

17. A shutter assembly as in claim 15 comprising a second fixed electric solenoid selectively energized to alternatively attract and repel the permanent magnet in reverse synchronization with the first fixed electric solenoid and respectively move the shutter to one and then the other of the shutter open and closed positions.

18. A shutter assembly as in claim 15 comprising a second permanent magnet fixed to the drive ring, the second permanent magnet being arranged so that it is repelled by the solenoid when the first permanent magnet is attracted, and attracted when the first permanent magnet is repelled.

19. A shutter assembly as in claim 18 comprising a second fixed electric solenoid selectively energized to alternatively attract and repel the second permanent magnet in reverse synchronization with the first fixed electric solenoid and respectively move the shutter to one and then the other of the shutter open and closed positions.

20. The shutter assembly as in claim 18 comprising a mechanical damper operative to damp the motion of the shutter blade at one of the open and closed positions in which the mechanical damper engages at least one of the permanent magnets.

21. The shutter assembly of claim 20 in which the mechanical damper engages both of the permanent magnets.

22. A shutter assembly as in claim 15 comprising a mechanical damper operative to damp the motion of the shutter blade at one of the open and closed positions.

23. A shutter assembly as in claim 15 comprising a mechanical damper operative for damping the motion of the shutter blade at both of the open and closed positions.

24. A shutter assembly as in claim 15 wherein the solenoid is positioned over the elongated opening.

25. A shutter assembly as in claim 15 wherein the solenoid is carried by the base.

26. A shutter assembly in claim 15 wherein the magnet is disposed between the solenoid and the base.

27. A shutter assembly as in claim 15 wherein a magnetic pole of the solenoid is offset from a magnetic pole of the permanent magnet in at least one of the shutter open the shutter closed positions.

28. A shutter assembly as in claim 27 wherein the magnetic pole of the solenoid is offset from the magnetic pole of the permanent magnet in both the shutter open and the shutter closed positions.

29. A shutter assembly as in claim 15 further including a second fixed electric solenoid wherein a magnet pole of the permanent magnet is positioned between a magnetic pole of the first solenoid and a magnetic pole of the second solenoid in both the shutter open and the shutter closed positions.

30. A shutter comprising:
   a) a base having an arcuate opening therein;
   b) at least one shutter blade mounted in the base and movable between an open position and a closed position;
   c) a non-magnetic drive ring disposed generally face-to-face with the shutter blade and having first and second oppositely-facing surfaces, the shutter blade being mechanically coupled to the first surface of the drive ring by elements on the shutter blade and drive ring cooperating to move the shutter blade to one or the other of the open and closed positions upon the to and fro rotation of the drive ring;
   d) a first permanent magnet connected to the second surface of the drive ring and traveling in a path extending along the arcuate opening; and
   e) a first electrically actuated solenoid in proximity to the magnet, the solenoid being operative to move the magnet in response to a signal applied to the solenoid, thereby moving the shutter blade between the open and closed positions.

31. A shutter assembly as in claim 30 wherein energizing the solenoid repels the permanent magnet to move the shutter to one of the open and closed positions and deenergizing the solenoid attracts the permanent magnet to move the shutter to the other of the open and closed positions.

32. A shutter assembly as in claim 30 comprising a second fixed electric solenoid selectively energized to alternatively attract and repel the permanent magnet in reverse synchronization with the first fixed electric solenoid and respectively move the shutter to one and then the other of the shutter open and closed positions.

33. A shutter assembly as in claim 30 comprising a second permanent magnet associated with the shutter blade, the second permanent magnet being arranged so that it is repelled by the solenoid when the first permanent magnet is attracted, and attracted when the first permanent magnet is repelled.

34. A shutter assembly as in claim 33 comprising a second fixed electric solenoid selectively energized to alternatively attract and repel the second permanent magnet in reverse synchronization with the first fixed electric solenoid and respectively move the shutter to one and then the other of the shutter open and closed positions.

35. The shutter assembly as in claim 33 comprising a mechanical damper operative to damp the motion of the shutter blade at one of the open and closed positions in which the mechanical damper engages at least one of the permanent magnets.

36. The shutter assembly of claim 35 in which the mechanical damper engages both of the permanent magnets.

37. A shutter assembly as in claim 30 comprising a mechanical damper operative to damp the motion of the shutter blade at one of the open and closed positions.

38. A shutter assembly as in claim 30 comprising a mechanical damper operative for damping the motion of the shutter blade at both of the open and closed positions.

39. A shutter assembly as in claim 30 wherein the solenoid is positioned over the elongated opening.

40. A shutter assembly as in claim 30 wherein the solenoid is carried by the base.

41. A shutter assembly as in claim 30 wherein the permanent magnet is disposed between the solenoid and the base.

42. A shutter assembly as in claim 30 wherein a magnetic pole of the solenoid is offset from a magnetic pole of the permanent magnet in at least one of the open and closed positions.

43. A shutter assembly as in claim 42 wherein the magnetic pole of the solenoid is offset from the magnetic pole of the permanent magnet in both the open and closed positions.

44. A shutter assembly as in claim 30 further including a second fixed electric solenoid wherein a magnetic pole of the permanent magnet is positioned between a magnetic pole of the first solenoid and a magnetic pole of the second solenoid in both the open and closed positions.

* * * * *